(12) United States Patent
Festag

(10) Patent No.: US 8,833,852 B2
(45) Date of Patent: Sep. 16, 2014

(54) VEHICLE SEAT ASSEMBLY

(75) Inventor: Peter Festag, Bayern (DE)

(73) Assignee: Lear Corporation, Southfield, MI (US)

( * ) Notice: Subject to any disclaimer, the term of this patent is extended or adjusted under 35 U.S.C. 154(b) by 503 days.

(21) Appl. No.: 12/989,715

(22) PCT Filed: Jul. 15, 2008

(86) PCT No.: PCT/US2008/070068
§ 371 (c)(1),
(2), (4) Date: Oct. 26, 2010

(87) PCT Pub. No.: WO2010/008379
PCT Pub. Date: Jan. 21, 2010

(65) Prior Publication Data
US 2011/0095578 A1 Apr. 28, 2011

(51) Int. Cl.
*B60N 2/42* (2006.01)
*B60R 21/207* (2006.01)
*B60N 2/58* (2006.01)
*B60R 21/215* (2011.01)
*B60R 21/16* (2006.01)

(52) U.S. Cl.
CPC ....... *B60R 21/207* (2013.01); *B60N 2002/5808* (2013.01); *B60R 21/215* (2013.01); *B60R 2021/161* (2013.01)
USPC ................ 297/216.13; 297/216.1; 280/728.3; 280/730.2; 280/729

(58) Field of Classification Search
CPC .............. B60R 21/207; B60R 21/2176; B60R 21/2165; B60R 2021/2176; B60R 2021/161

USPC ............ 297/216.13, 216.1; 280/728.3, 730.2, 280/729
See application file for complete search history.

(56) References Cited

U.S. PATENT DOCUMENTS

| | | | |
|---|---|---|---|
| 5,498,030 A * | 3/1996 | Hill et al. .................... | 280/743.1 |
| 5,651,562 A * | 7/1997 | Hagen et al. ............... | 280/728.3 |
| 5,762,363 A | 6/1998 | Brown et al. | |
| 5,860,673 A | 1/1999 | Hasegawa et al. | |
| 5,863,063 A | 1/1999 | Harrell | |
| 5,927,749 A | 7/1999 | Homier et al. | |
| 5,938,232 A | 8/1999 | Kalandek et al. | |
| 5,967,546 A | 10/1999 | Homier et al. | |
| 6,007,091 A | 12/1999 | Westrich | |
| 6,045,151 A * | 4/2000 | Wu ............................ | 280/728.3 |
| 6,237,934 B1 | 5/2001 | Harrell et al. | |
| 6,237,936 B1 * | 5/2001 | Quade et al. ............... | 280/730.2 |
| 6,352,304 B1 | 3/2002 | Sorgenfrei | |
| 6,357,789 B1 | 3/2002 | Harada et al. | |
| 6,386,577 B1 | 5/2002 | Kan et al. | |
| 6,450,528 B1 * | 9/2002 | Suezawa et al. ........... | 280/730.2 |
| 6,457,741 B2 | 10/2002 | Seki et al. | |
| 6,588,838 B1 | 7/2003 | Dick, Jr. et al. | |

(Continued)

FOREIGN PATENT DOCUMENTS

CN 2554055 Y 6/2003

*Primary Examiner* — Laurie Cranmer
(74) *Attorney, Agent, or Firm* — Brooks Kushman P.C.

(57) ABSTRACT

A vehicle seat assembly having a seat pad, a trim cover, an air bag module, and a pad shield. The air bag module has an air bag, an inflator, and a housing that receives the air bag when the air bag is in a stored condition. The pad shield extends at least partially around the housing. Inflation of the air bag forces the pad shield against the seat pad to inhibit the air bag from contacting at least a portion of the seat pad.

20 Claims, 2 Drawing Sheets

(56) References Cited

U.S. PATENT DOCUMENTS

| | | |
|---|---|---|
| 7,004,496 B2 | 2/2006 | Bossecker et al. |
| 7,134,685 B2 | 11/2006 | Panagos et al. |
| 7,278,656 B1 | 10/2007 | Kalandek |
| 7,290,791 B2 | 11/2007 | Tracht |
| 7,290,792 B2 * | 11/2007 | Tracht ................. 280/730.2 |
| 7,290,793 B2 * | 11/2007 | Tracht ................. 280/730.2 |
| 7,309,078 B2 | 12/2007 | Nagata |
| 7,311,325 B2 | 12/2007 | Tracht et al. |
| 7,322,497 B2 | 1/2008 | Redlin |
| 7,322,597 B2 | 1/2008 | Tracht |
| 7,328,912 B2 | 2/2008 | Tracht et al. |
| 7,357,412 B2 * | 4/2008 | Tracht et al. ............ 280/730.2 |
| 7,681,907 B2 * | 3/2010 | Svenbrant et al. ........ 280/728.2 |
| 7,823,912 B2 * | 11/2010 | Tracht et al. ............ 280/730.2 |
| 2004/0195029 A1 | 10/2004 | Feldman |
| 2006/0113764 A1 | 6/2006 | Tracht |
| 2007/0222196 A1 * | 9/2007 | Harvey et al. ............ 280/740 |

* cited by examiner

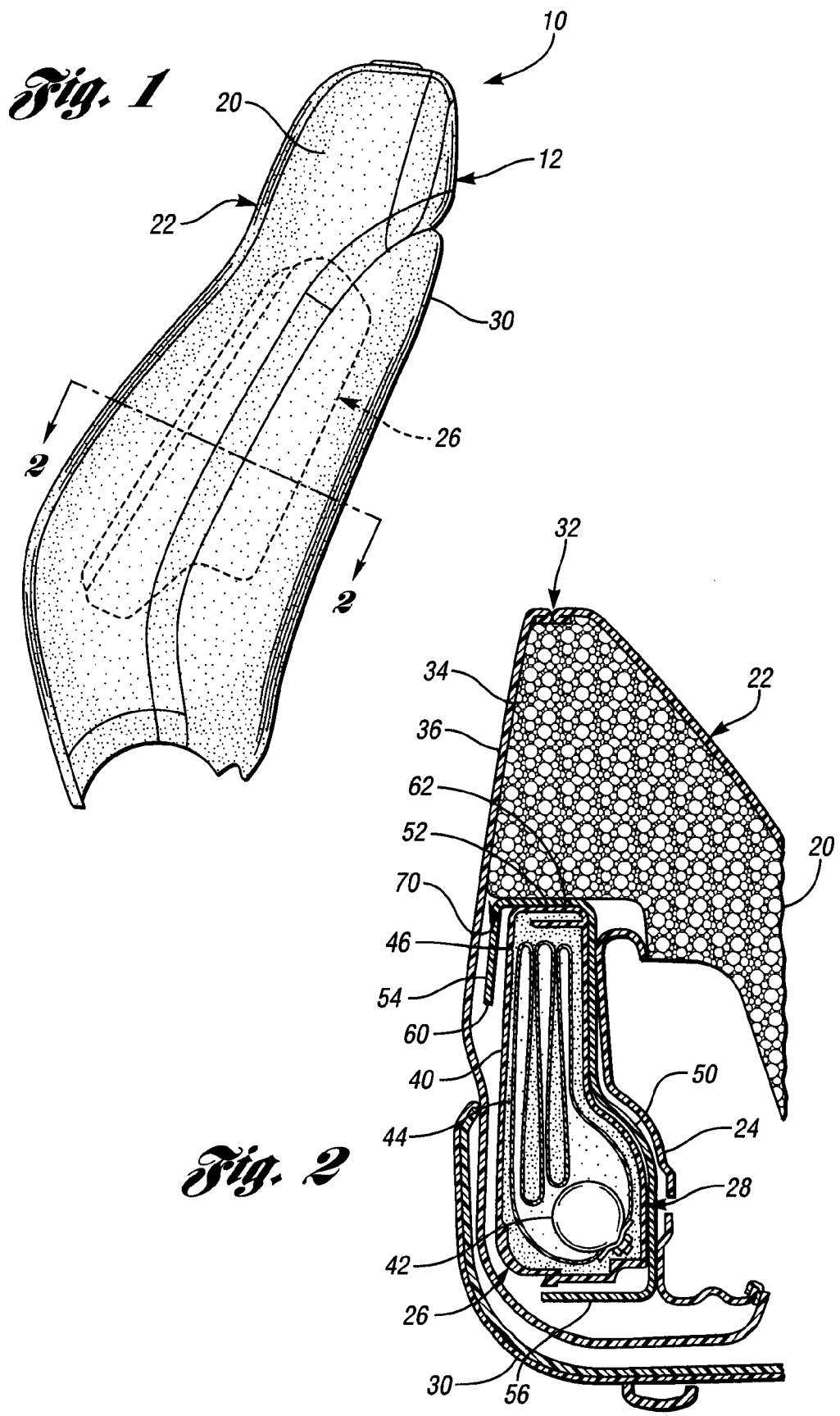

VEHICLE SEAT ASSEMBLY

BACKGROUND OF THE INVENTION

Field of the Invention

The present invention relates to a vehicle seat assembly, such as a seat assembly having an air bag.

SUMMARY OF THE INVENTION

In at least one embodiment, a vehicle seat assembly is provided. The vehicle seat assembly includes a frame, a seat pad disposed proximate the frame, a trim cover, an air bag module, and a pad shield. The trim cover is disposed over the seat pad and includes a seam. The air bag module is disposed proximate the frame and has an air bag, an inflator adapted to provide an inflation gas to inflate the air bag from a stored condition to an inflated condition, and a housing that receives the air bag when the air bag is in the stored condition. The pad shield extends at least partially around the housing. Inflation of the air bag forces the pad shield against the seat pad to inhibit the air bag from contacting at least a portion of the seat pad.

In at least one embodiment, a vehicle seat assembly is provided. The vehicle seat assembly includes a frame, a seat pad disposed proximate the frame, a trim cover, an air bag module, and a pad shield. The trim cover is disposed over the seat pad and includes a seam. The air bag module is disposed proximate the frame. The air bag module has a housing that receives an air bag when the air bag is in the stored condition. The housing has a frangible portion that separates to facilitate deployment of the air bag. The pad shield extends at least partially around the housing and covers the frangible portion when the air bag is in the stored condition.

In at least one embodiment, a vehicle seat assembly is provided. The vehicle seat assembly includes a frame, a cushion disposed proximate the frame, a trim cover, an air bag module, and a pad shield. The trim cover is disposed over the cushion and including a seam adjacent a side of the cushion. The air bag module includes an air bag that is disposed in a housing when in a stored condition and an inflator configured to supply gas to the air bag, thereby facilitating deployment of the air bag. The pad shield has an end portion that is disposed in a first position that extends away from the seam when the air bag is in the stored condition and disposed in a second position that extends toward the seam and covers a portion of the cushion when the air bag in an inflated condition.

BRIEF DESCRIPTION OF THE DRAWINGS

FIG. 1 is a fragmentary side view of a portion of a seat assembly.

FIG. 2 is a fragmentary section view of the seat assembly shown in FIG. 1 taken through line 2-2.

DETAILED DESCRIPTION

Figure 3C:
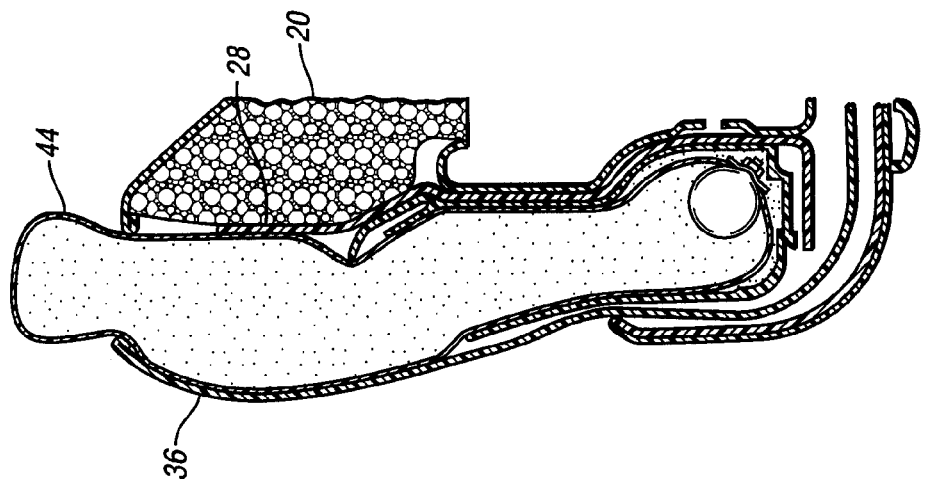
FIGS. 3A-3C are fragmentary section views of the seat assembly shown in FIG. 1, illustrating deployment of an air bag.

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Referring to FIG. 1, a portion of a seat assembly 10 for a motor vehicle is shown. The seat assembly 10 may include a seat bottom adapted to be mounted to a vehicle and a seat back 12. The seat back 12 may be disposed proximate the seat bottom and may be adapted to pivot with respect to the seat bottom.

Referring to FIG. 2, the seat back 12 is shown in more detail. In the embodiment shown, the seat back 12 includes a seat pad or cushion 20, a trim cover 22, a frame 24, an air bag module 26, a pad shield 28, and a back panel 30.

The cushion 20 may have any suitable configuration and may be made of any suitable material, such as molded polymeric material like polyurethane foam. In the embodiment shown, the cushion 20 is disposed proximate the frame 24 and may be attached to the frame 24 at various locations.

The trim cover 22 is configured to form an exterior surface of the seat assembly 10. The trim cover 22 may be made of any suitable material, such as fabric, vinyl, and/or leather. The trim cover 22 may be disposed proximate one or more surfaces of the cushion 20. In addition, the trim cover 22 may be attached to the cushion 20 in any suitable manner, such as with an adhesive, stitching, or fastener. The trim cover 22 may also include a seam 32 disposed proximate a side 34 of the seat pad 20 and a side 36 of the trim cover 22.

The frame 24 may have any suitable configuration and may be made of any suitable material, such as a metal, polymeric material, or combinations thereof. The frame 24 provides a support structure for the seat back 12.

The air bag module 26 may include a housing 40, an inflator 42, and an air bag 44. The air bag module 26 may be disposed in any suitable location. In the embodiment shown in FIG. 2, the air bag module 26 is disposed proximate the frame 24. Moreover, the air bag module 26 may be fastened to the frame 24 in any suitable manner, such as with one or more fasteners.

The housing 40 may be configured to receive at least a portion of the air bag 44 when the air bag 44 is deflated. The housing 40 may have any suitable configuration and may be made of any suitable material or materials. For example, the housing 40 may have a rigid polymeric configuration or may include one or more soft cover portions that may be made of TYVEC® or other suitable materials. In the embodiment shown, the housing 40 surrounds the air bag 44 when the air bag 44 is in a stored condition. The housing 40 may include a frangible portion 46 that is adapted to tear or separate in response to force exerted by the air bag 44 when the air bag 44 is inflated. In the embodiment shown, the frangible portion 46 is located on a side of the housing 40 that faces toward a lateral side of the seat assembly 10 and near an end of the housing 40 disposed near the cushion 20.

The inflator 42 is adapted to provide an inflation gas to the air bag 44. The inflator 42 may be disposed in any suitable location. In the embodiment shown in FIG. 2, the inflator 42 is disposed within the housing 40. Alternatively, the inflator 42 may be disposed outside the housing 40 and may be fluidly connected to the air bag 44 in any suitable manner, such as with a tube.

The air bag 44 is configured to expand from a stored condition to an inflated or deployed condition when the inflation gas is provided. The air bag 44 may be deflated and concealed by the housing 40 and/or back panel 30 when in the stored condition and may be inflated and positioned between a seat occupant and an interior vehicle surface when in the inflated condition. In FIG. 2, the air bag 44 is shown in the stored condition.

The air bag 44 may have any suitable configuration and may be made of any suitable material. For example, the air bag 44 may be made of multiple panels that are assembled in any suitable manner, such as by stitching, bonding, or with an adhesive. Alternatively, the air bag 44 may be integrally formed. Optionally, the air bag 44 may include one or more tethers that control the shape of the air bag 44 upon deployment. The air bag 44 may be configured to cushion the head, thorax, and/or pelvis of the seat occupant when deployed.

The pad shield 28 may be configured to help cover and/or protect the cushion 20 upon deployment of the air bag 44. The pad shield 28 may be made of any suitable material that can flex or reconfigure upon air bag deployment and withstand forces associated with air bag deployment. For example, the pad shield 28 may be a fleece, textile material, or polymeric material. The pad shield 28 may be formed in a predetermined shape such that the pad shield 28 generally maintains a configuration prior to air bag deployment. Moreover, the pad shield 28 may have a unitary construction and may include one or more reinforcement layers or surface that help maintain shape and/or withstand deployment forces.

The pad shield 28 may be disposed proximate the air bag module 26. For example, the pad shield 28 may extend at least partially around the housing 40. In the embodiment shown, the pad shield 28 includes a back portion 50, a first side portion 52, a second side portion 54, and a third side portion 56.

The back portion 50 may be disposed between the frame 24 and the housing 40. As such, the back portion 50 may help secure the pad shield 28 in a desired position.

The first side portion 52 may extend from the back portion 50. The first side portion 52 may be disposed along a side of the housing 40 that faces toward the front of the seat. In the embodiment shown, the first side portion 52 is generally disposed between the housing 40 and the cushion 20.

The second side portion 54 may extend from the first side portion 52 and include a free end 60. Moreover, the second side portion 54 may cover or conceal the frangible portion 46 when the air bag 44 is in the stored condition. As such, the second side portion 54 has sufficient length to contact the air bag 44 and help protect the cushion 20 during deployment of the air bag 44 as will be described in more detail below. The back portion 50, first side portion 52, and second side portion 54 may generally cooperate to create a U-shaped configuration that extends around and end of the air bag module 26 that faces toward the cushion 20.

The third side portion 56 may extend from an end of the back portion 50 disposed opposite the first side portion 52. The third side portion 56 may extend around the housing 40 to help secure the pad shield 28 and or conceal the air bag module 26.

The back panel 30 may wrap around the back and one or more sides of the seat assembly 10. The back panel 30 may at least partially conceal the air bag module 26 prior to air bag deployment. In the embodiment shown, the back panel 30 has a side portion that is spaced apart from the air bag module 26 and extends toward the front side of the seat assembly 10. The back panel 30 may be attached to the seat assembly 10 in any suitable manner, such as with hooks, fasteners, and/or an adhesive.

In addition, a padding layer such as foam may be disposed between the air bag module 26 and an exterior seat surface, such as a side of the trim cover 22 and/or the back panel 30. Moreover, the padding layer may extend from opposite ends of the pad shield 28. For instance, a padding layer may generally extend from the second side portion 54 to the third side portion 56 of the pad shield 28. In at least one embodiment, the padding layer may be spaced apart from the housing 40 of the air bag module 26 to provide a gap. In addition, the padding layer may extend past the third side portion 56 toward a portion of the seat frame 24 in one or more embodiments of the present invention.

Figure 3B:
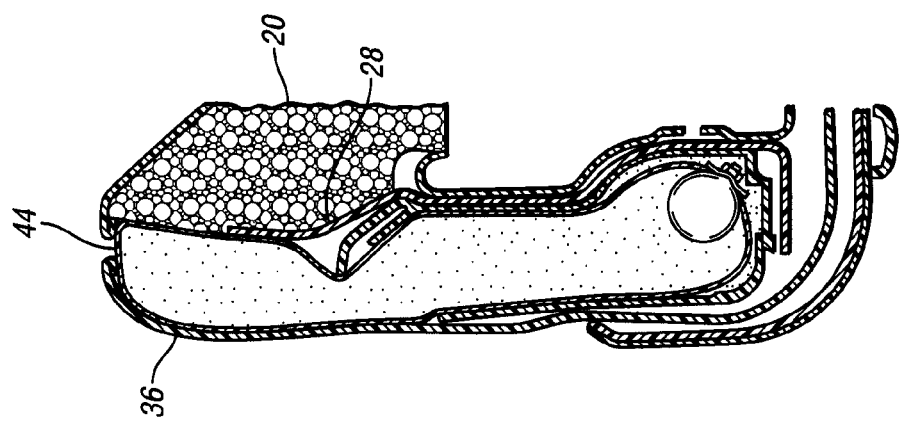
Figure 3A:
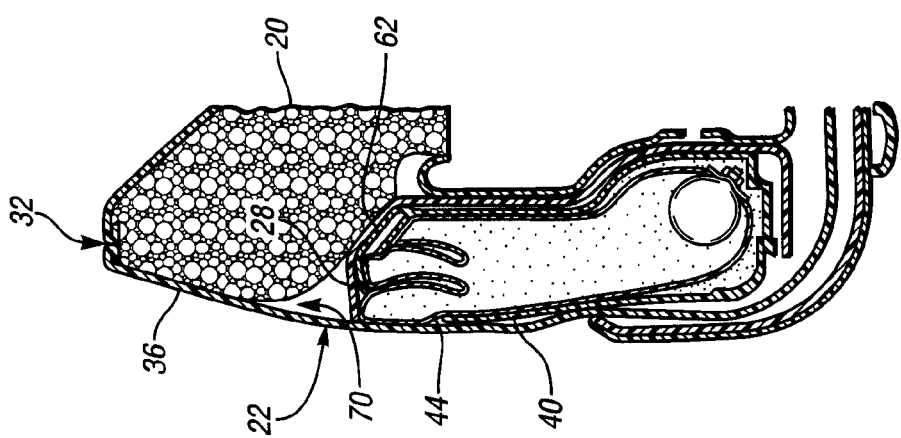

Referring to FIGS. 3A-3C, an exemplary air bag deployment sequence is shown.

In FIG. 3A, the air bag 44 has just started to deploy. As the air bag 44 is inflated, it exerts force on the housing 40, causing the frangible portion 46 to separate. In the embodiment shown, a panel of the housing 40 moves toward a portion of the trim cover 22 that extends along the side of the seat assembly 10. As additional inflation gas is provided, the air bag 44 expands from the housing 40 and may contact the trim cover 22. In addition, the front end 62 of the housing 40 may move toward the cushion 20 and push against the pad shield 28. As such, the pad shield 28 may move into a deployment path 70 as the air bag 44 moves down the deployment path 70.

In FIG. 3B, the air bag 44 has moved substantially down the deployment path 70, making its way between the side 36 of the trim cover 22 and the pad shield 28. As the air bag 44 moves down the deployment path 70, it pushes against the pad shield 28, which inhibits contact between the air bag 44 and at least a portion of the cushion 20 covered by the pad shield 28. In the embodiment shown, the pad shield 28 covers a portion of the cushion 20 when it is disposed in the deployment path 70. Alternatively, a longer pad shield may be provided that covers substantially all of the cushion 20 in one or more embodiments of the present invention. The presence of the pad shield 28 may reduce friction on the air bag 44 and its deployment time. At the end of the deployment path 70, the air bag 44 reaches the seam 32 in the trim cover 22, which then separates under the force of the deploying air bag 44.

In FIG. 3C, the air bag 44 has traversed the seam 32 in the trim cover 22 and is now expanding outside the seat assembly 10 to provide protection for a seated occupant. As shown in FIG. 3C, the side 36 of the trim cover 22 undergoes some deflection as the air bag 44 exits the seat assembly 10. This deflection does not impede deployment of the air bag 44, as the general direction of the air bag 44 during deployment is along the deployment path 70, and thus, most of the energy of the air bag 44 is directed toward the seam 32 in the trim cover 22.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
   a frame;
   a seat pad disposed proximate the frame;
   an air bag module disposed proximate the frame, the air bag module having an air bag, an inflator adapted to provide an inflation gas to inflate the air bag from a stored condition to an inflated condition, wherein the air bag extends through a deployment path when in the inflated condition;
   a trim cover disposed over the seat pad and including a seam through which the air bag deploys when inflated; and a pad shield that has a distal end, the pad shield being detached from the trim cover and spaced apart from the seam such that the distal end is not disposed in the deployment path when the air bag is in the stored condition and the distal end is disposed in the deployment path when the air bag is in the inflated condition.

2. The vehicle seat assembly of claim 1 wherein the seam is disposed adjacent to a side of the seat pad and is configured to separate when the air bag is inflated.

3. The vehicle seat assembly of claim 1 wherein the distal end extends away from the seat pad when the air bag is in the stored condition.

4. The vehicle seat assembly of claim 1 wherein the distal end extends away from the seam when the air bag is in the stored condition and wherein the distal end extends toward the seam when the air bag is in the inflated condition.

5. The vehicle seat assembly of claim 1 wherein the distal end is positioned against the seat pad between the seam and a housing that receives the air bag when the air bag is in the stored condition upon inflation of the air bag.

6. The vehicle seat assembly of claim 1 wherein the pad shield includes a first portion disposed between a housing that receives the air bag and the seat pad and a second portion extending from the first portion that is disposed between the housing and the trim cover when the air bag is in the stored condition.

7. The vehicle seat assembly of claim 1 wherein the pad shield includes a fleece material.

8. The vehicle seat assembly of claim 1 wherein the trim cover and the seat pad cooperate to define the deployment path.

9. A vehicle seat assembly, comprising:
a frame;
a seat pad disposed proximate the frame;
a trim cover disposed over the seat pad;
an air bag module disposed proximate the frame, the air bag module having a housing that receives an air bag when the air bag is in a stored condition, the housing having a frangible portion that separates to facilitate deployment of the air bag; and
a pad shield that extends at least partially around the housing and is not disposed between the seat pad and the trim cover when the air bag is in the stored condition;
wherein the pad shield covers the frangible portion when the air bag is in the stored condition.

10. The vehicle seat assembly of claim 9 wherein the pad shield does not cover the frangible portion when the air bag is inflated.

11. The vehicle seat assembly of claim 9 wherein inflation of the air bag forces the pad shield against the seat pad to inhibit the air bag from contacting at least a portion of the seat pad.

12. The vehicle seat assembly of claim 9 wherein the frangible portion is disposed on a side of the housing disposed adjacent to the trim cover.

13. The vehicle seat assembly of claim 9 wherein the pad shield is spaced apart from the trim cover when the air bag is in the stored condition.

14. The vehicle seat assembly of claim 9 wherein at least a portion of the pad shield is generally U-shaped and extends around three sides of the housing when the air bag is in the stored condition.

15. The vehicle seat assembly of claim 9 wherein the housing surrounds the air bag when the air bag is in the stored condition.

16. A vehicle seat assembly, comprising:
a frame;
a cushion disposed proximate the frame;
a trim cover disposed over the cushion and including a seam adjacent a side of the cushion;
an air bag module including an air bag that is disposed in a housing when in a stored condition and an inflator configured to supply gas to the air bag, thereby facilitating deployment of the air bag; and
a pad shield having an end portion that is disposed in a first position that extends away from the seam when the air bag is in the stored condition and disposed in a second position that extends toward the seam and covers a portion of the cushion when the air bag in an inflated condition, wherein a portion of the cushion that is covered by the end portion when the end portion is in the second position contacts the trim cover when the end portion is in the first position.

17. The vehicle seat assembly of claim 16 further comprising a deployment path disposed between the trim cover and the cushion, wherein the end portion is located outside the deployment path when the air bag is in the stored condition and moves into the deployment path when the air bag is inflated.

18. The vehicle seat assembly of claim 16 wherein the pad shield is spaced apart from the seam.

19. The vehicle seat assembly of claim 16 wherein the end portion is spaced apart from the housing when the air bag is in the inflated condition.

20. The vehicle seat assembly of claim 16 wherein the end portion contacts the trim cover during inflation of the air bag and is spaced apart from the trim cover when the air bag is in the inflated condition.

* * * * *